Patented Mar. 6, 1934

1,950,079

UNITED STATES PATENT OFFICE 1,950,079

AROMATIC AMINE

Arthur W. Campbell, Stow, Ohio, assignor to The B. F. Goodrich Company, New York, N. Y., a corporation of New York No Drawing. Application March 14, 1932, Serial No. 598,885

19 Claims. (Cl. 260—65)

This invention relates to the art of chemical manufacture and particularly to the preparation of certain new aromatic amines.

It has heretofore been found that triphenyl methyl chloride will react with diphenylamine to produce a secondary amine, which may conveniently be designated as p-phenylamino tetraphenyl methane or as p-triphenylmethyl diphenylamine, and which melts at 242° C. I have discovered, however, that when triphenyl methyl chloride is reacted with diphenylamine in the presence of anhydrous aluminum chloride, the course of the reaction is modified and a considerable proportion of a new material is formed, which has the same empirical composition as the p-phenylamino tetraphenyl methane referred to above, but which has a much higher melting point, namely, 350° C. This new substance exhibits all the usual properties of a diarylamine, and is believed to have the following structural formula

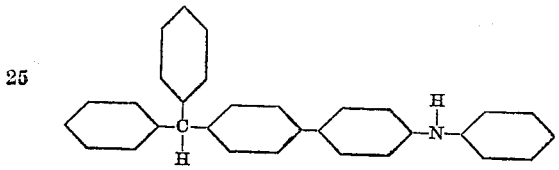

This substance may accordingly be termed p-diphenylmethyl p'-phenylamino biphenyl.

Similar products may be obtained from other triarylmethyl halides such as tritolyl methyl chloride, tribiphenyl methyl chloride, etc. when reacted in the presence of aluminum chloride with diarylamines such as diphenylamine, phenyltolyl amine, phenyl naphthylamine, phenyl biphenylamine, etc., particularly when one of the aromatic rings in each component has a replaceable hydrogen in the para position. However, the products of this new reaction are not necessarily para substituted compounds, hence other positions of the constituent groups are not excluded.

The reaction is not limited solely to diarylamines, for dimethylaniline, diethylaniline, and other aromatic amines and substituted aromatic amines undergo the same general reaction with triarylmethyl chlorides, with the formation of biaryl compounds having an amino group substituted on one of the aromatic rings and a diarylmethyl group on the other.

As a specific example of a preferred embodiment of my invention 546 parts by weight of dry benzene and 308 parts of dry carbon tetrachloride are placed in a glass lined reactor equipped with an agitator and reflux condenser. 267 parts of anhyrous aluminum chloride are gradually added while the mixture is stirred, whereupon triphenylmethyl chloride is rapidly formed. About one hour after the last of the aluminum chloride is added 338 parts of diphenylamine dissolved in an equal quantity of benzene are added and the batch is heated to a refluxing temperature for an hour. 500 parts of water are then slowly added to decompose the aluminum chloride complex formed, the heat of the reaction being sufficient to distill off all the free benzene. The reaction mixture is then washed successively with hot water, sodium hydroxide solution, and again with water, to remove the aluminum hydroxide. The product, which is a tan powder consisting of a mixture of the desired substance with p-phenylamino tetraphenyl methane, is then dried.

The desired substance, p-diphenylmethyl p'-phenylamino biphenyl, is isolated by dissolving the dry mixture in a high boiling solvent such as o-dichlorbenzene or mineral oil of the grade generally known as spindle oil, at a temperature of about 220° C. Upon cooling, the desired substance precipitates from solution, while the other components of the mixture remain dissolved. It is a light brownish powder, melting at a temperature well above 300° C., the exact melting point depending on its purity. It is very slightly soluble in the volatile organic solvents, and may be further purified by reprecipitation and washing. The melting point is approximately 350° C. when pure. It may be employed as a dyestuff intermediate, as an anti-oxidant, etc.

Other compounds of the same general type may be prepared by the method described above when the appropriate raw materials are substituted. The invention is therefore not to be limited to the specific embodiment described, but is limited only as required by the prior art and as indicated in the appended claims.

It is to be understood that the term "diarylmethyl" and other like terms are employed in the appended claims to designate a methyl radical, two hydrogens of which are substituted by aryl groups.

I claim:

1. The method of preparing an aromatic amine which comprises reacting a triaryl methyl halide with an aromatic amine in the presence of anhydrous aluminum chloride.

2. The method of preparing a secondary aromatic amine which comprises reacting a triaryl methyl chloride with a diarylamine in the presence of anhydrous aluminum chloride.

3. The method of preparing a secondary aromatic amine which comprises reacting a triaryl methyl chloride and a diarylamine, each of which contains a replaceable hydrogen in the para position on one of the aromatic rings, in the presence of anhydrous aluminum chloride.

4. The method of preparing a secondary aromatic amine which comprises reacting carbon tetrachloride with an aromatic hydrocarbon in the presence of anhydrous aluminum chloride, adding a diarylamine, and separating the high-melting product.

5. The method of preparing a secondary aromatic amine which comprises reacting triphenyl methyl chloride with a phenyl arylamine in the presence of anhydrous aluminum chloride, and separating the high-melting product.

6. The method of preparing a secondary aromatic amine which comprises reacting triphenyl methyl chloride with diphenylamine in the presence of anhydrous aluminum chloride.

7. The method of preparing a secondary aromatic amine which comprises reacting benzene with carbon tetrachloride in the presence of anhydrous aluminum chloride, reacting the mixture further with diphenylamine, and separating the high-melting product.

8. The method of preparing a secondary aromatic amine which comprises reacting triphenyl methyl chloride with diphenylamine in the presence of anhydrous aluminum chloride, and separating the amine melting above 300° C.

9. The method of preparing a secondary aromatic amine which comprises reacting benzene with carbon tetrachloride in the presence of anhydrous aluminum chloride, reacting the mixture further with the diphenylamine, extracting the aluminum chloride with water, and crystallizing the residue from a high boiling solvent to recover the amine melting above 300° C.

10. The method of preparing an aromatic amine which comprises reacting triphenyl methyl chloride with dimethylaniline in the presence of anhydrous aluminum chloride, and separating the high-melting product.

11. An aromatic amine containing a biaryl nucleus to one aromatic ring of which is directly attached the amino group, and a diarylmethyl group directly attached to the other ring.

12. A diarylamine containing a biaryl nucleus to one aromatic ring of which is directly attached the aryl substituted amino group, and a diarylmethyl group directly attached to the other ring.

13. A diarylamine containing a biphenyl nucleus to one aromatic ring of which is directly attached the aryl substituted amino group, and a diarylmethyl group directly attached to the other ring.

14. A diarylamine containing a biphenyl nucleus to one aromatic ring of which is directly attached the aryl substituted amino group, and a diphenylmethyl group directly attached to the other ring.

15. A secondary aromatic amine consisting of p-diphenylmethyl p'-phenylamino biphenyl.

16. A secondary aromatic amine having the empirical formula $C_{31}H_{25}N$ and a melting point of approximately 350° C. when pure.

17. An substituted aromatic amine containing a biphenyl nucleus to one aromatic ring of which is directly attached the hydrocarbon substituted amino group, and a diphenylmethyl group directly attached to the other ring.

18. An aromatic amine containing a biphenyl nucleus to one aromatic ring of which is directly attached the amino group in the para position, and a diphenylmethyl group directly attached to the other ring also in the para position.

19. An aromatic amine consisting of p-diphenylmethyl p'-dimethylamino biphenyl.

ARTHUR W. CAMPBELL.